United States Patent
Quong (10) Patent No.: US 11,475,088 B2
(45) Date of Patent: *Oct. 18, 2022

(54) PROVIDING NOTIFICATIONS BASED ON GEOFENCING SEARCH RESULTS

(71) Applicant: GOOGLE LLC, Mountain View, CA (US)

(72) Inventor: Russell Quong, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/168,801

(22) Filed: Feb. 5, 2021

(65) Prior Publication Data

US 2021/0157873 A1  May 27, 2021

Related U.S. Application Data

(60) Continuation of application No. 16/165,851, filed on Oct. 19, 2018, now Pat. No. 10,977,328, which is a
(Continued)

(51) Int. Cl.
*G06F 16/248* (2019.01)
*G06F 16/9537* (2019.01)
(Continued)

(52) U.S. Cl.
CPC ........ *G06F 16/9537* (2019.01); *G06F 16/248* (2019.01); *G06F 16/2455* (2019.01); *G06F 16/2457* (2019.01)

(58) Field of Classification Search
None
See application file for complete search history.

(56) References Cited

U.S. PATENT DOCUMENTS

| 7,848,765 | B2 | 12/2010 | Phillips et al. |
| 8,090,620 | B2 | 1/2012 | Wiseman et al. |

(Continued)

FOREIGN PATENT DOCUMENTS

| CA | 2791714 | 4/2013 |
| CN | 102291435 | 9/2012 |

(Continued)

OTHER PUBLICATIONS

Korean Intellectual Property Office: Office Action issued for Application No. 10-2020-7014906; 10 pages; dated Feb. 7, 2021.
(Continued)

*Primary Examiner* — Wilson Lee
(74) *Attorney, Agent, or Firm* — Dority & Manning, P.A.

(57) ABSTRACT

Systems and methods for providing notifications based on geofencing search results are provided. In particular, in response to a search query from a user, a plurality of search results can be determined. One or more physical search results having an associated geographic location can be determined from the plurality of search results. A geofencing search result can be generated for at least one of the physical search results. The geofencing search result can include data for establishing a geofence proximate to the geographic location by a user device associated with the user. Upon selection of the geofencing search result by the user, the geofence can be established by the user device. Upon detecting entry into the established geofence, the user device can provide one or more notifications associated with the geofence and/or the search query to the user.

20 Claims, 4 Drawing Sheets

Related U.S. Application Data division of application No. 14/881,406, filed on Oct. 13, 2015, now Pat. No. 10,120,948.

(51) Int. Cl.
*G06F 16/2455* (2019.01)
*G06F 16/2457* (2019.01)

(56) References Cited

U.S. PATENT DOCUMENTS

| | | | |
|---|---|---|---|
| 8,666,660 | B2 | 3/2014 | Sartipi et al. |
| 9,277,365 | B1 | 3/2016 | Wilden et al. |
| 10,977,328 | B2* | 4/2021 | Quong ............... G06F 16/9537 |
| 2008/0086349 | A1 | 4/2008 | Petrie |
| 2012/0295639 | A1 | 11/2012 | Fitoussi et al. |
| 2012/0310971 | A1 | 12/2012 | Tran |
| 2013/0110624 | A1 | 5/2013 | Mitrovic |
| 2013/0184009 | A1 | 7/2013 | Attar et al. |
| 2013/0218912 | A1* | 8/2013 | Howard ............ G01C 21/3682 707/769 |
| 2013/0295639 | A1 | 11/2013 | Bentley et al. |
| 2013/0324160 | A1 | 12/2013 | Sabatellil et al. |
| 2014/0257747 | A1 | 9/2014 | Repenning et al. |
| 2015/0005009 | A1 | 1/2015 | Tomkins et al. |
| 2015/0081327 | A1 | 3/2015 | Mooker |
| 2015/0120357 | A1 | 4/2015 | Tuchman et al. |
| 2015/0227618 | A1 | 8/2015 | Dong et al. |
| 2015/0237470 | A1 | 8/2015 | Mayor et al. |
| 2016/0057572 | A1 | 2/2016 | Bojorquez et al. |
| 2016/0117910 | A1 | 4/2016 | Rajala |
| 2016/0148266 | A1* | 5/2016 | Hollar ............... G06Q 30/0269 705/14.58 |
| 2016/0192325 | A1* | 6/2016 | Borras ................. H04L 41/069 455/567 |
| 2016/0203651 | A1* | 7/2016 | Heath .................... H04W 4/40 705/13 |
| 2016/0345132 | A1* | 11/2016 | Creighton ............ H04W 4/021 |
| 2016/0366557 | A1* | 12/2016 | Gallegos .............. H04W 4/021 |
| 2017/0067748 | A1* | 3/2017 | Glover ............... G01C 21/3679 |
| 2017/0069000 | A1* | 3/2017 | Duleba .................. G06F 16/23 |
| 2017/0078840 | A1 | 3/2017 | Saurav et al. |
| 2018/0032997 | A1* | 2/2018 | Gordon ............ G06Q 30/0269 |

FOREIGN PATENT DOCUMENTS

| | | |
|---|---|---|
| CN | 105934650 | 9/2017 |
| CN | 104219305 | 6/2018 |
| JP | 2012141749 | 7/2012 |
| JP | 2014532951 | 12/2014 |
| RU | 2406129 | 12/2010 |
| WO | 2012058457 | 5/2012 |
| WO | 2013122840 | 8/2013 |

OTHER PUBLICATIONS

China National Intellectual Property Administration: Notice To Grant issued for Application No. 201680058920.6 dated Aug. 21, 2020.
Korean Intellectual Property Office: Office Action issued for Application No. 10-2020-7014906 dated Aug. 14, 2020.
Intellectual Property India; Examination Report issue in Application No. 201847013957; 6 pages; dated Jul. 13, 2020.
The Korean Intellectual Property Office; Notice of Allowance issued in Application No. 10-2018-7011065; 3 pages; dated Apr. 21, 2020.
European Patent Office; Summons to attend oral proceedings pursuant to Rule 115(1) issued in Application No. 16856106.6 dated Mar. 30, 2020.
The European Patent Office; Examination Report issued in Application No. 16856106.6 dated Sep. 18, 2019.
The Russian Patent Office; Decision to Grant issued in Application No. 2018113289 dated May 20, 2019.
The Japan Patent Office; Office Action issued in Application No. 2018-519010, 16 pages, dated May 20, 2019.
TechBooster; "Effective Android;" Impress Japan, 1st Ed. 1st printing, pp. 236-334, Jul. 21, 2014.
The Korean Intellectual Property Office; Office Action issued in Application No. 10-2018-7011065; 8 pages; dated Oct. 30, 2019.
China National Intellectual Property Administration; Office Action issued in Application No. 2016800589206; 17 pages; dated Nov. 27, 2019.
The Japan Patent Office; Notice of Allowance issued in Application No. 2018-519010, 3 pages, dated Jan. 14, 2020.
Russian Patent Office; Office Action issued in Application No. 2018113289 dated Feb. 14, 2019.
European Patent Office; Extended European Search Report issued in Application No. 16856106.6 dated Feb. 20, 2019.
International Search Report and Written Opinion of PCT Ser. No. PCT/US16/56631 dated Jan. 10, 2017.

* cited by examiner

PROVIDING NOTIFICATIONS BASED ON GEOFENCING SEARCH RESULTS

FIELD

The present disclosure relates generally to geofences, and more particularly to providing geofence data in a web search result listing.

BACKGROUND

Search engines may be used to locate various resources on the Internet. For example, a user may submit a search query to a search engine and, in response to the search query, the search engine may generate a number of search results based on the search query and return the search results to the user.

In recent years, location based functionality associated with mobile computing devices has become increasingly popular. Location based functionality can allow a user device, such as a smart phone, tablet or wearable computing device, to receive information corresponding to a particular location and to perform actions associated with the information. For instance, the actions can be performed based on a user device location relative to a geofence. A geofence can specify a boundary associated with a geographic location. When entry into a geofence is detected by a user device, the user device can perform one or more actions associated with the geofence. For instance, the user device can provide for display a notification associated with the geofence and/or the geographic location.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of providing geofence-based notifications. The method includes receiving, by one or more computing devices, data indicative of a search query from a user. The method further includes determining, by the one or more computing devices, one or more physical search results based at least in part on the search query from the user. The one or more physical search results have an associated geographic location. The method further includes generating, by the one or more computing devices, one or more additional search results associated with the one or more physical search results. Each of the one or more additional search results are associated with a geofence to be established around a geographic location associated with a physical search result.

Other example aspects of the present disclosure are directed to systems, apparatus, tangible, non-transitory computer-readable media, user interfaces, memory devices, and electronic devices for establishing geofences.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to establishing geofences on a user device based at least in part on one or more geofencing search result elements. For instance, in response to a search query from a user, a plurality of search results relating to the search query can be determined. At least one physical search result having an associated geographic location can be identified from the plurality of search results. One or more geofencing search results can be generated and associated with the at least one physical search result. The geofencing search results can be associated with data for establishing a geofence around or near a geographic location associated with a physical search result. The user can select a geofencing search result, and in response to the selection, a geofence can be established by the user device based at least in part on the data associated with the geofencing search result. When the user device detects entry into the geofence, the user device may provide a notification associated with the geofence and/or the geographic location to the user.

More particularly, a user may input a search query into a search engine, such as a web search engine. The search engine can be configured to retrieve a plurality of search results relating to the search query and to provide at least a portion of the search results to the user. For instance, in response to receiving data indicative of the search query, the search engine may access one or more databases (e.g. search engine index) to identify data related to the search query. Such data can include, for instance, web sites, images, videos, location data, etc. One or more physical search results can then be identified from the search results. As used herein, a physical search result is a search result having an associated geographic location. As an example, a physical search result may have an associated brick and mortar store at a particular geographic location. For instance, a search query for a circular saw may return results associated with information relating to circular saws, images of circular saws, and/or one or more physical search results such as hardware stores or other locations that carry circular saws for purchase. The one or more physical search results may include an address or other information indicative of a location associated with the physical search result. For instance, a physical search result associated with a hardware store may include an address of the hardware store.

Additional search results can be generated for one or more of the physical search results. The additional search results can be geofencing search results that include data for establishing a geofence around or near a geographic location associated with a physical search result. As used herein, a geofence can be a virtual perimeter for a geographic area. In particular, a geofence can define a geographic region. A geofence can generally be defined as a circle, and can be specified using latitude, longitude coordinates indicative of the center of the circle, and a radius indicative of the size of the circle. Other suitable geometric shapes can also be used, for instance, by using various polygons and/or multiple overlapping circles. In this manner, the geofencing search results can include data indicative of a geographic location for which to establish the geofence (e.g. latitude, longitude coordinates), and a size and/or shape of the geofence (e.g. radius). The geofencing search result may further include an expiration time or other temporal indicator associated with a length of time for which the geofence is to be established.

In example embodiments, a geofencing search result can be generated and displayed as an additional listing on a search engine results page. In particular, a search engine results page provided in response to a search query for hardware stores can include one or more listings indicative of the search results. Each listing may, for instance, include a link (e.g. hyperlink) to data associated with the search query (e.g. search results). In this manner, the geofencing search result may be displayed as an independent listing on the search engine results page. In alternative embodiments, a geofencing search result may be displayed in association with a search result listing. For instance, the geofencing search result may be displayed as an icon or other indicator located proximate a physical search result with which the geofencing search result is associated.

Upon a selection of a geofencing search result by a user, a user device of the user can establish a geofence around or near the geographic location associated with the geofencing search result. As indicated above, a geofencing search result may include data indicative of a location of a geofence, a size of a geofence, a shape of a geofence, and/or an expiration date or establishment period for the geofence. Such data can be provided to the user device, and the user device can establish the geofence in accordance with the provided data. For instance, if a user selects a geofencing search result associated with a geographic location of a hardware store, a geofence can be established around or near the hardware store by the user device.

In alternative embodiments, one or more geofencing results may be implemented as user interface elements provided for display, for instance, by the user device associated with the user. In such embodiments, the user device may be configured to generate the geofencing elements based at least in part on search results received in response to a search query. In particular, upon receiving search results from the search engine, the user device can determine one or more geographic locations based on the received search results. The user device can then generate and provide for display one or more geofencing elements associated with the geographic locations. Upon a user selection of a geofencing element, the user device can establish a geofence around or near the geographic location associated with the geofencing element. In this manner, the user device can be configured to establish one or more geofences based on search results without the need for communication with the search engine.

The user device can further be configured to determine a current geographic location of the user device. For instance, the geographic location can be determined using GPS, IP address, cell triangulation, proximity to Wi-Fi access points, proximity to beacon devices, or other suitable location determination techniques. The user device can further determine a location of the user device relative to one or more geofences established by the user device. In this manner, the user device can detect entry into a geofence. Upon detecting entry into a geofence, the user device can perform one or more action associated with the geofence. For instance, the one or more actions can include providing a notification to the user possessing the user device. In continuing the example above regarding the hardware store, if the user device detects entry into the geofence established around the hardware store, the user device may provide a notification associated with the hardware store and/or the search query that caused the hardware store to be provided as a search result (e.g. circular saw). The notification may include an address of the hardware store, directions to the hardware store, and/or other information. In this manner, the user can be reminded of a previous search query when the user is near the hardware store. In example embodiments, a list or other indicator of the one or more actions can be provided to the user, such that the user may select one or more desired actions to be performed.

In response to receiving a user selection of one or more desired actions associated with the geofence, the geofence can be removed from the user device. In this manner, the user device will no longer detect entry into the geofence, and will no longer perform actions associated with the geofence. In alternative embodiments, the geofence can be removed from the user device at the expiration time (or in accordance with some other temporal indicator, such as a time period) associated with the length of time for which the geofence is to be established. In a particular embodiment, the geofence can be removed from the user device upon the earlier of performing one or more cations associated with the geofence and the expiration time.

Figure 1:
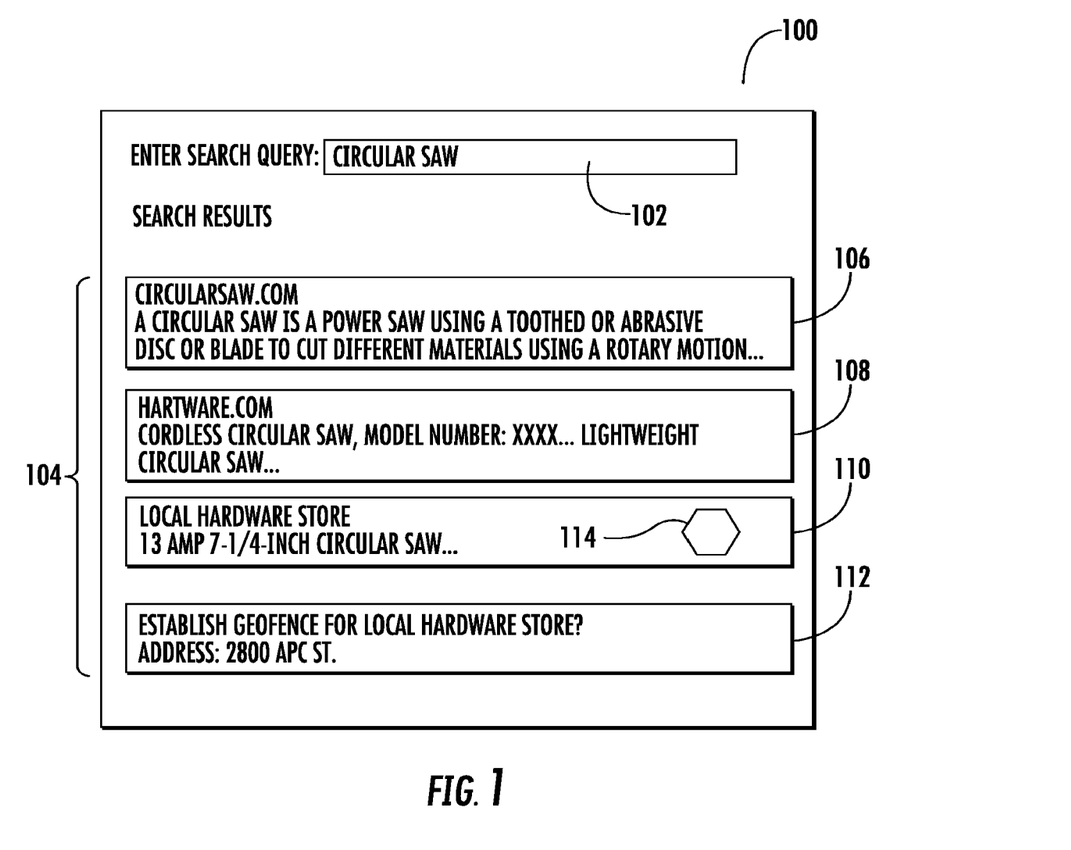
FIG. 1 depicts an example web search engine user interface according to example embodiments of the present disclosure.

With reference now to the figures, example embodiments of the present disclosure will be discussed in further detail. FIG. 1 depicts an example user interface 100 for receiving a search query from a user and providing search results based on the search query. User interface 100 may be provided for display, for instance, by a user device, such as user device 202 depicted in FIG. 2, or other computing device. For instance, user interface 100 may be provided in a web browser or in a special purpose application executed by user device 202, or other computing device.

As depicted, user interface 100 can include an input field 102, and a search results block 104. Input field 102 can be configured to receive an input from a user indicative of a search query. For instance, the search query may be a keyword or series of keywords input by a user (e.g. circular saw). Search results block 104 can include visual representations associated with one or more search results 106, 108, and 110. The search results 106-110 may include information related to the search query. As shown, search results 106-110 can include links to various websites associated with circular saws, and a short descriptor of the information included in the website. Search results block 104 can further include various other information related to circular saws, such as images, videos, mapping data associated with places to purchase circular saws, etc. In addition, although only five search results are illustrated in FIG. 1, search results block 104 can include any suitable number of search results.

Search results block 104 further includes geofencing elements 112 and 114. Geofencing elements 112, 114 can include data associated with a geofence to be established on or by a user device. As indicated above, geofencing elements can be displayed as an independent search result (e.g. geofencing element 112), and/or as an indicator in association with another search result (e.g. geofencing element 114). For instance, geofencing element 112 is displayed as an independent search result listing prompting the user to establish a geofence around or near the "Local Hardware Store." Geofencing element 114 is displayed as an icon associated with search result 110. It will be appreciated that, although geofencing element 112 is associated with establishing a geofence for the local hardware store of search result 110, geofencing element 112 (or other geofencing element) can be associated with establishing a geofence for various other suitable search results having an associated physical location without deviating from the scope of the present disclosure. In alternative embodiments, geofencing element 112 and/or geofencing element 114 can be user interface elements generated and provided for display by the user device. As will be described in greater detail below, a user selection of either geofencing element 112 or geofencing element 114 will cause a geofence to be established around or near the local hardware store. It will be appreciated that, although only two geofencing elements are depicted, search results block 104 can include any suitable number of geofencing elements. For instance, any physical search result (e.g. search result having an associated geographic location) displayed in search results block 104 can have an associated geofencing search result.

Figure 2:
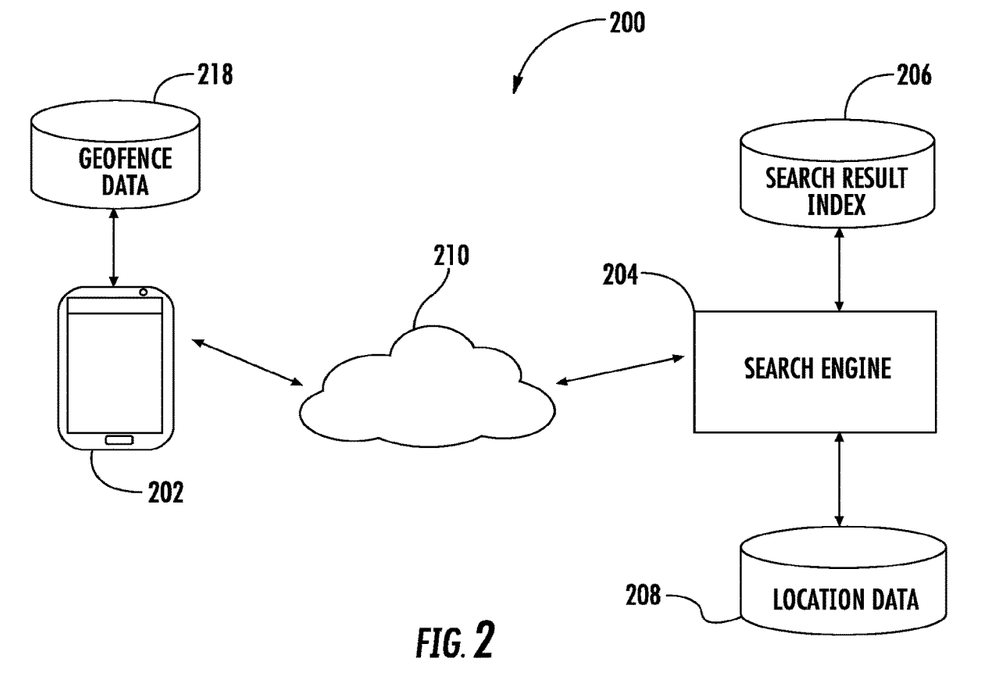
FIG. 2 depicts an overview of an example system for providing geofencing search results according to example embodiments of the present disclosure.

FIG. 2 depicts an overview of an example system 200 for establishing geofences associated with search results. System 200 includes a user device 202 and a search engine 204. User device 202 can provide for display a user interface associated with a web search engine, such as user interface 100. User device 202 can receive a search query from a user and provide the search query to search engine 204 via a network 210. In example embodiments, search engine 204 can be hosted on a remote computing device, such as a web server. Search engine 204 can access a search result index 206 to determine a plurality of search results. Search engine 204 can further access location data 208 to determine one or more physical search results from the plurality of search results. Although FIG. 2 depicts location data 208 as being stored in a separate location (e.g. separate databases) from search result index 206, it will be appreciated that location data 208 can be stored in search index 206 (e.g. with each corresponding search result). Search engine 204 can further be configured to generate geofencing search results for at least one physical search result based at least in part on the geographic location of the at least one physical search result. The geofencing search results can include data indicative of a location of the geofence to be established, a size of the geofence to be established, and an establishment period or duration for the geofence. In example embodiments, the geofencing search result can further include information relating to the search query and/or the physical search result with which the geofencing search result is associated.

One or more search results listings can be provided to user device 202, for instance, via user interface 100. The user can then select a search result. If the user selects a geofencing search result, such as geofencing element 112 or 114, a geofence can be established and stored by user device 202. For instance, user device 202 can store data indicative of the established geofence as geofence data 212. When user device 202 detects entry into the established geofence (e.g. using one or more location determination techniques), user device 202 can perform one or more actions associated with the geofence. For instance, user device 202 can provide one or more notifications associated with the geofencing search result. In particular, the notification(s) can include information associated with the search query, the geographic location associated with the physical search result, the entity associated with the physical search result, etc. For instance, the notifications may include a reminder that the user searched for circular saws, directions to the geographic location associated with the geofence, a link to the website of the entity associated with the geofence, etc. In example embodiments, the notification may be a visual notification provided for display, an audible notification, a vibratory notification or other suitable notification.

In alternative embodiments, a search query may be input by a user on a second computing device, such as a laptop computer or a desktop computer, and the search results may be provided to the second computing device. In this manner, when the user selects a geofencing search result, the data indicative of the geofence to be established by the user device can be provided from the second computing device to user device 202.

In further alternative embodiments, user device 202 can establish a geofence without a use selection of a geofencing search result. In such embodiments, user device 202 may parse search results (e.g. www.localhardwarestore.com) and execute a map query for "local hardware store." One or more nearby local hardware store locations can be determined from the map query results. The user device can then establish and store a geofence around at least one of the one or more nearby locations.

Figure 3:
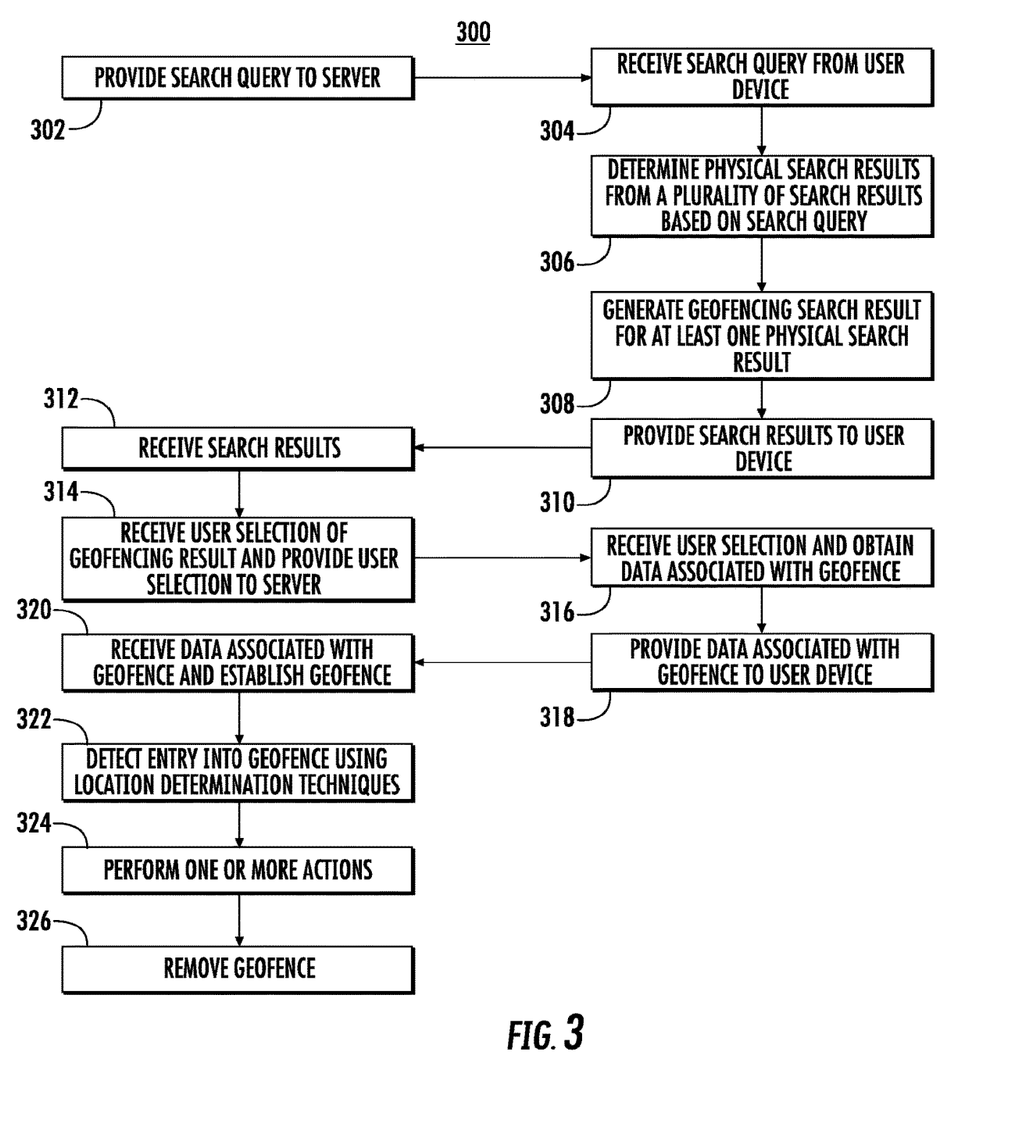
FIG. 3 depicts a flow diagram of an example method of providing notifications based on geofencing search results according to example embodiments of the present disclosure.

FIG. 3 depicts a flow diagram of an example method (300) of establishing geofences based on a search query and providing notifications based on the established geofences according to example embodiments of the present disclosure. Method (300) can be implemented by one or more computing devices, such as one or more of the computing devices depicted in FIG. 4. In particular implementations, the method (300) can be implemented by user device 202 and search engine 204 depicted in FIG. 2. In addition, FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), method (300) can include providing, by a user device, a search query to a server. For instance, the search query can be a keyword or a string of keywords input by a user. In example embodiments, the search query may be a textual search query (e.g. input using a physical or touch-screen keyboard), a voice search query (e.g. input by providing one or more audible keywords to the user device), and/or various other suitable search queries. At (304), method (300) can include receiving, by the server, the search query. In example embodiments, the server can host a search engine and/or a mapping application such as a geographic information system. At (306), method (300) can include determining, by the server, one or more physical search results based on the search query. Physical search results can include search results related to the search query that have an associated geographic location. For instance, a physical search result can be a search result associated with a business or entity that has a physical location such as a store. A physical search result can be determined at least in part based on the presence of an address or other location indicator associated with the search result. In example embodiments, the physical search results can be a subset of the entire set of search results determined by the server, or the entire set of search results determined by the server. In this manner, a set of search results related to the search query can be determined, and the search results can be analyzed to determine which of the search results have associated physical locations.

At (308), method (300) can include generating, by the server, geofencing search results associated with at least one physical search result. For instance, a geofencing search result can be generated for physical search results based on the relevance of the physical search results. In this manner, a geofencing search result can be generated for physical search results above a relevance threshold. It will be appreciated, that any suitable number of geofencing search results can be generated for any number of physical search results. At (310), method (300) can include providing, by the server, the search results to the user device. For instance, the server can provide the geofencing search results along with the other determined search results.

At (312), method (300) can include receiving, by the user device, the search results from the server. The search results can be provided for display by the user device, for instance, in a user interface associated with a search engine results page. At (314), method (300) can include receiving, by the user device, a user selection of a geofencing search result. The user device can then provide data indicative of the user selection to the server.

At (316), method (300) can include receiving, by the server, the data indicative of the user selection. The server can then obtain data associated with the geofence. For instance, the data associated with the geofence can include data indicative of a location of the geofence, data indicative of the size of the geofence, data indicative of the shape of the geofence, and an expiration time and/or establishment period associated with the geofence. In example embodiments, the geofence data can be determined automatically and/or can be specified by a user. For instance, in embodiments wherein a physical search result has multiple associated geographic locations, the locations for which geofences are to be established can be determined automatically based at least in part on a current geographic location of the user and/or user device, or may be determined based on an input from a user specifying the location(s) for which a geofence should be established.

At (318), method (300) can include providing, by the server, the obtained geofence data to the user device. At (320), method (300) can include receiving, by the user device, the geofence data. The user device can then establish a geofence in accordance with the geofence data. For instance, the user device may establish the geofence using one or more applications executed by the user device. In alternative embodiments, the geofence data can be provided to the user device in (310) of method (300). For instance, the geofence data can be provided to the user along with the corresponding geofencing search results. In such embodiments, (318) of method (300) may be bypassed and method (300) can proceed from (316) directly to (320).

At (322), method (300) can include detecting entry into the established geofence. For instance, the user device can detect entry into the geofence using one or more location determination techniques to determine a geographic location of the user device. The user device can then compare the determined location to the established geofence to determine a location of the user device relative to the geofence.

At (324), method (300) can include, in response to detecting entry into the geofence, performing one or more actions associated with the geofence. For instance, as indicated above, the one or more actions may include providing for display a notification associated with the geofence. The notification(s) may include information relating to the search query, the geographic location of the physical search result, the entity associated with the physical search result, etc.

In example embodiments, the detection of entry into the geofence, and/or the one or more performed actions can be reported to the search engine for use in evaluating the performance of the geofencing search result and/or the physical search result. For instance, the detection of entry into the geofence can be used to determine the relevance of the search result in future search result ranking implementations. In further embodiments, the further reporting can be performed if the user actually travels to the geographic location once the one or more actions are performed. For instance, in response to detecting entry into the geofence and the performance of the one or more actions, a second geofence can be established by the user device approximately corresponding to the perimeter of the entity associated with the physical search result. It will be appreciated that the user's presence at the geographic location can be detected in various other suitable manners. Detection of entry into the second geofence can then be reported to the search engine for further use, for instance, in evaluating the performance of the search result.

At (326), method (300) can include removing, by the user device, the geofence. For instance, the geofence may be removed in response to performing the one or more actions associated with the geofence. As another example, the geofence may be removed at the expiration time associated with the geofence.

In alternative embodiments, the user device may adjust the geofence, for instance, in response to a user interaction with the user device by the user. For instance, the user may wish to adjust a size, shape, location, or other characteristic associated with the geofence. In this manner, the geofence may be moved, resized, and/or reshaped in response to the user interaction.

Figure 4:
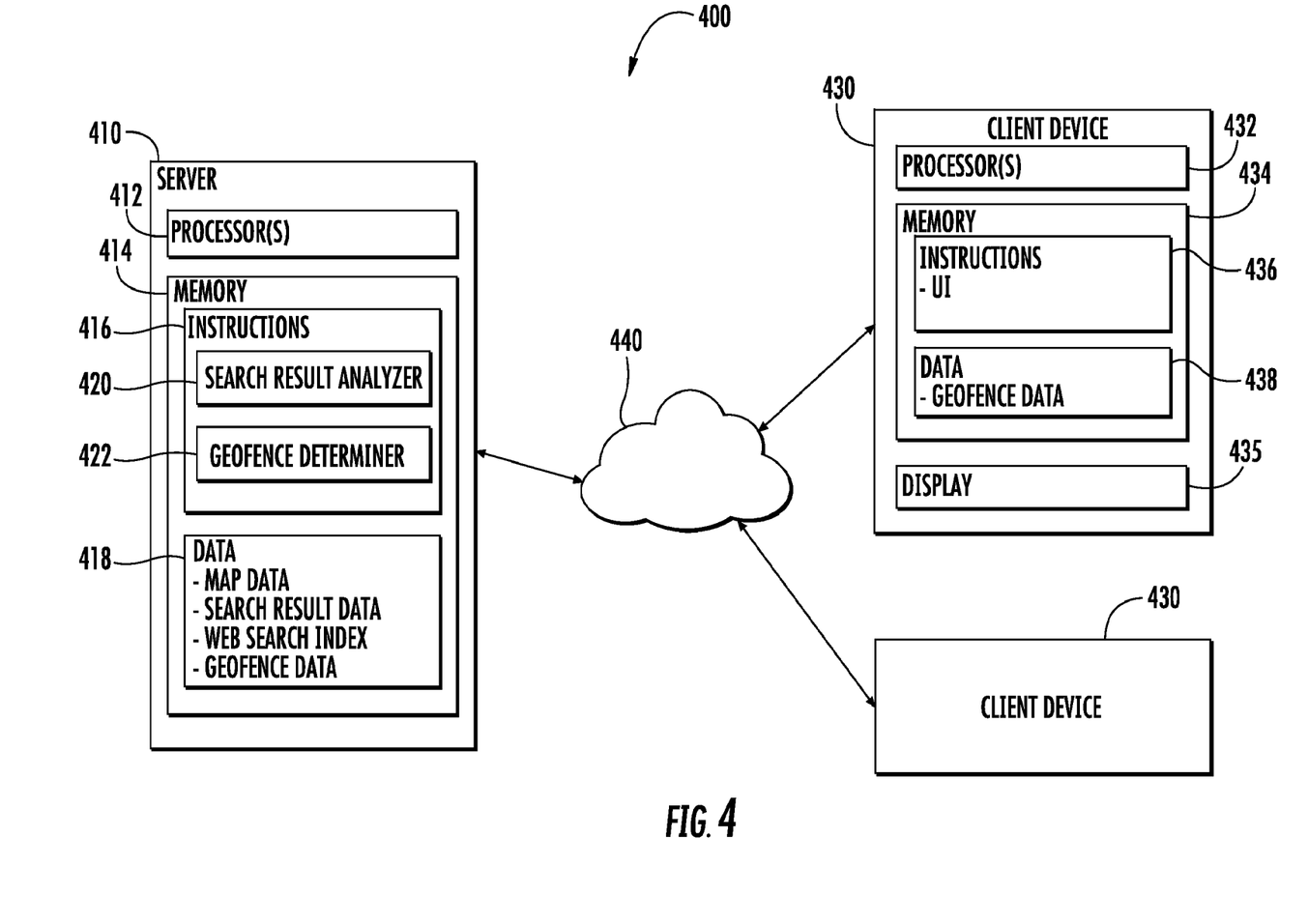
FIG. 4 depicts an example system according to example embodiments of the present disclosure.

FIG. 4 depicts an example computing system 400 that can be used to implement the methods and systems according to example aspects of the present disclosure. The system 400 can be implemented using a client-server architecture that includes a server 410 that communicates with one or more client devices 430 over a network 440. The system 400 can be implemented using other suitable architectures, such as a single computing device.

The system 400 includes a server 410, such as a web server. The server 410 can host a web search engine and a geographic information system, such as a geographic information system associated with a mapping service. The server 410 can be implemented using any suitable computing device(s). The server 410 can have one or more processors 412 and one or more memory devices 414. The server 410 can also include a network interface used to communicate with one or more client devices 430 over the network 440. The network interface can include any suitable components for interfacing with one more networks, including for example, transmitters, receivers, ports, controllers, antennas, or other suitable components.

The one or more processors 412 can include any suitable processing device, such as a microprocessor, microcontroller, integrated circuit, logic device, or other suitable processing device. The one or more memory devices 414 can include one or more computer-readable media, including, but not limited to, non-transitory computer-readable media, RAM, ROM, hard drives, flash drives, or other memory devices. The one or more memory devices 414 can store information accessible by the one or more processors 412, including computer-readable instructions 416 that can be executed by the one or more processors 412. The instructions 416 can be any set of instructions that when executed by the one or more processors 412, cause the one or more processors 412 to perform operations. For instance, the instructions 416 can be executed by the one or more processors 412 to implement a search result analyzer 420 and a geofence determiner 422.

As shown in FIG. 4, the one or more memory devices 414 can also store data 418 that can be retrieved, manipulated, created, or stored by the one or more processors 412. The data 418 can include, for instance, mapping data, search result data, web search index data, geofence data, and other data. The data 418 can be stored in one or more databases. The one or more databases can be connected to the server 410 by a high bandwidth LAN or WAN, or can also be connected to server 410 through network 440. The one or more databases can be split up so that they are located in multiple locales.

The server 410 can exchange data with one or more client devices 430 over the network 440. Although two client devices 430 are illustrated in FIG. 8, any number of client devices 430 can be connected to the server 410 over the network 440. Each of the client devices 430 can be any suitable type of computing device, such as a general purpose computer, special purpose computer, laptop, desktop, mobile device, navigation system, smartphone, tablet, wearable computing device, a display with one or more processors, or other suitable computing device.

Similar to the server 410, a client device 430 can include one or more processor(s) 432 and a memory 434. The one or more processor(s) 432 can include one or more central processing units (CPUs), graphics processing units (GPUs) dedicated to efficiently rendering images or performing other specialized calculations, and/or other processing devices. The memory 434 can include one or more computer-readable media and can store information accessible by the one or more processors 432, including instructions 436 that can be executed by the one or more processors 432 and data 438. For instance, the memory 434 can store instructions 436 for implementing a user interface module for displaying search results according to example embodiments of the present disclosure.

The client device 430 of FIG. 4 can include various input/output devices for providing and receiving information from a user, such as a touch screen, touch pad, data entry keys, speakers, and/or a microphone suitable for voice recognition. For instance, the client device 430 can have a display device 435 for presenting a user interface displaying semantic place names according to example aspects of the present disclosure.

The client device 430 can also include a network interface used to communicate with one or more remote computing devices (e.g. server 410) over the network 440. The network interface can include any suitable components for interfacing with one more networks, including for example, transmitters, receivers, ports, controllers, antennas, or other suitable components.

The network 440 can be any type of communications network, such as a local area network (e.g. intranet), wide area network (e.g. Internet), cellular network, or some combination thereof. The network 440 can also include a direct connection between a client device 430 and the server 410. In general, communication between the server 410 and a client device 430 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method implemented by one or more processors, the method comprising:
  receiving a search query inputted by a user at a user device;
  determining a plurality of search results, that are responsive to the search query, to provide for display responsive to the search query, each of the search results including a corresponding link and a corresponding short descriptor;
  generating a given geofencing element, for a given search result of the plurality of search results, based on determining that the given search result is associated with a particular geographic location;
  concurrently loading, for display by the user device, the plurality of search results, the concurrent providing including loading the given search result for display within a first search result interface element, providing the given geofencing element within a second search result interface element, and providing a further search result, of the plurality of search results, for display within a third search result interface element without a corresponding geofencing element; and
  establishing, responsive to a selection of the given geofencing element within the second search result interface element when displayed at the user device, a geofence around the particular geographic location and for the user device, wherein establishing the geofence causes, based on a subsequent detection of entry of the user device into the geofence, providing of a notification associated with the geofence.

2. The method of claim 1, wherein establishing the geofence comprises establishing the geofence with a temporal duration for the geofence.

3. The method of claim 1, further comprising removing the geofence upon expiration of a temporal indicator that indicates a length of time for which the geofence is to be established.

4. The method of claim 1, further comprising removing the geofence responsive to determining one or more actions, associated with the geofence, have been performed.

5. The method of claim 1, wherein the notification includes content associated with the given search result.

6. The method of claim 5, wherein the notification includes content associated with the search query.

7. The method of claim 5, wherein the notification includes content associated with the particular geographic location.

8. The method of claim 1, wherein the notification is a vibratory notification provided at the user device.

9. The method of claim 1, wherein generating the given geofencing element based on determining that the given search result is associated with the particular geographic location, comprises determining the particular geographic location based on a current geographic location of the user device.

10. The method of claim 1, further comprising:
subsequent to establishing the geofence:
receiving location data indicative of a current geographic location of the user device;
detecting entry of the user device into the geofence based at least in part on the received location data; and
causing the user device to provide the notification responsive to detecting the entry of the user device into the geofence.

11. A system, comprising:
one or more memory devices storing computer-readable instructions;
one or more processors executing the computer-readable instructions to cause the one or more processors to:
receive a search query inputted by a user at a user device;
determine a plurality of search results, that are responsive to the search query, to provide for display responsive to the search query, each of the search results including a corresponding link and a corresponding short descriptor;
generate a given geofencing element, for a given search result of the plurality of search results, based on determining that the given search result is associated with a particular geographic location;
concurrently load, for display by the user device, the plurality of search results, the concurrent providing including loading the given search result for display within a first search result interface element, providing the given geofencing element within a second search result interface element, and providing a further search result, of the plurality of search results, for display within a third search result interface element without a corresponding geofencing element;
establish, responsive to a selection of the given geofencing element within the second search result interface element when displayed at the user device, a geofence around the particular geographic location and for the user device, wherein establishing the geofence causes, based on a subsequent detection of entry of the user device into the geofence, providing of a notification associated with the geofence.

12. The system of claim 11, wherein in establishing the geofence one or more of the processors are to establish the geofence with a temporal duration for the geofence.

13. The system of claim 11, wherein one or more of the processors are further to remove the geofence upon expiration of a temporal indicator that indicates a length of time for which the geofence is to be established.

14. The system of claim 11, wherein one or more of the processors are further to remove the geofence responsive to determining one or more actions, associated with the geofence, have been performed.

15. The system of claim 11, wherein the notification includes content associated with the given search result.

16. The system of claim 15, wherein the notification includes content associated with the search query.

17. The system of claim 15, wherein the notification includes content associated with the particular geographic location.

18. The system of claim 11, wherein the notification is a vibratory notification provided at the user device.

19. The system of claim 11, wherein in generating the given geofencing element based on determining that the given search result is associated with the particular geographic location, one or more of the processors are to determine the particular geographic location based on a current geographic location of the user device.

20. The system of claim 11, wherein one or more of the processors are further to, subsequent to establishing the geofence:
receive location data indicative of a current geographic location of the user device; detect entry of the user device into the geofence based at least in part on the received location data; and cause the user device to provide the notification responsive to detecting the entry of the user device into the geofence.

* * * * *